United States Patent [19]
Blakely et al.

[11] Patent Number: 5,375,207
[45] Date of Patent: * Dec. 20, 1994

[54] REMOTE PROCESSING OF A PLURALITY OF COMMANDS DURING A SESSION BETWEEN A FIRST COMPUTER AND A HOST COMPUTER

[75] Inventors: Frank W. Blakely, Roseville; Guy T. Hall, Loomis; Sherry Winkleblack, Orangevale; Jim Scaccia, Roseville, all of Calif.; Shinichi Iwamoto, Ohmiya; Minoru Nojiri, Zushi, both of Japan; Yukihiko Umezawa, Sacramento, Calif.

[73] Assignee: Hewlett-Packard Company, Palo Alto, Calif.

[ * ] Notice: The portion of the term of this patent subsequent to Aug. 28, 2007 has been disclaimed.

[21] Appl. No.: 796,481

[22] Filed: Nov. 22, 1991

Related U.S. Application Data

[63] Continuation of Ser. No. 265,421, Oct. 31, 1988, Pat. No. 5,124,909.

[51] Int. Cl.$^5$ .......................... G06F 3/00; G06F 15/16
[52] U.S. Cl. ..................................... 395/200; 395/500; 364/222.2; 364/222.81; 364/228.3; 364/239; 364/242.94; 364/262.4; 364/284; 364/284.4; 364/DIG. 1
[58] Field of Search ............... 395/800, 200, 275, 725, 395/600, 325, 700, 500; 364/200, 900

[56] References Cited

U.S. PATENT DOCUMENTS

| | | | |
|---|---|---|---|
| 4,274,139 | 6/1981 | Hodgkinson et al. | 395/200 |
| 4,564,903 | 1/1986 | Guyette et al. | 364/200 |
| 4,646,235 | 2/1987 | Hirosawa et al. | 395/275 |
| 4,751,635 | 6/1988 | Kret | 395/600 |
| 4,882,674 | 11/1989 | Quint et al. | 395/700 |
| 4,924,434 | 5/1990 | Christenson et al. | 364/900 |
| 4,994,963 | 2/1991 | Rorden et al. | 395/325 |
| 5,036,484 | 7/1991 | McCoy et al. | 395/500 |
| 5,058,000 | 10/1991 | Cox et al. | 364/200 |
| 5,109,515 | 4/1992 | Laggis et al. | 395/725 |
| 5,142,683 | 8/1992 | Burkhardt et al. | 395/725 |
| 5,257,366 | 10/1993 | Adair et al. | 395/600 |

FOREIGN PATENT DOCUMENTS

| | | |
|---|---|---|
| 0006216 | 6/1979 | European Pat. Off. |
| 0193933 | 3/1986 | European Pat. Off. |
| 0205948 | 5/1986 | European Pat. Off. |

OTHER PUBLICATIONS

C. Wang et al., "An Application Protocol for Network-wide Database Access", Journal of Telecommunication Networks, vol. 2, No. 3, 1983, 283, 294.
D. Notkin, et al., "Interconnecting Heterogeneous Computer Systems", Communications of the ACM, vol. 31, No. 3, Mar. 1988, pp. 258-273.

Primary Examiner—Alyssa H. Bowler
Assistant Examiner—Meng-Ai T. An

[57] ABSTRACT

In a computer system having a host computer connected to one or more personal computers, a data transport system sends data back and forth between the host computer and the personal computers. Individual applications on a personal computer utilize resources on the host computer by use of a requester process existing on the personal computer. The requester process translates or reformats commands and associated information for sending to the host computer. A host server oversees the execution of such commands received by the host computer, and may call database intrinsics, operating system intrinsics, or remote procedure intrinsics to obtain execution of the command.

2 Claims, 5 Drawing Sheets

REMOTE PROCESSING OF A PLURALITY OF COMMANDS DURING A SESSION BETWEEN A FIRST COMPUTER AND A HOST COMPUTER

CROSS REFERENCE TO RELATED APPLICATION

This is a continuation of application Ser. No. 07/265,421, filed Oct. 31, 1988, Pat. No. 5,124,909.

BACKGROUND

The use of personal computers for processing provides several advantages to the user. For instance, since there is typically only one user, computer response time is predictable. Further, a personal computer may be portable, and is isolated from other users so that there is no worry about another user causing a system "crash".

Similarly, performing operations on a larger, or host computer provides certain advantages. For instance, on a host computer a central data base may be kept. In such a data base a large amount of data may be centrally managed assuring that all users of the data base have access to valid, "up-to-data" information. It is desirable to design systems which utilize both personal computers and a host computer and which profit from the advantages of each type of computer.

SUMMARY OF THE INVENTION

In accordance with the preferred embodiment of the present invention a computer system is presented. The computer system has a host computer, one or more personal computers and a data transport system which transports data between the host computer and the personal computers.

On each personal computer reside a number of applications. Each application may utilize the resources on the host computer by use of a requester program existing on the personal computer and a host server residing on the host computer. When the application desires a command to be processed by the host server, the application transfers the command to the requester program. Transfer of the command may be done in the form of a normal procedure call. The requester receives the command and any parameters or other data associated therewith. The requester program translates or reformats the command and associated information in preparation for sending the command et al. to the host computer.

The requester hands the translated command to data transport software. The data transport software serves to interface the requester with the data transport system and serves to interface the host server with the transport system. The translated command is thereby transferred from the requester to the host server.

The host server oversees the execution of the commands. In the preferred embodiment, there are five categories of commands. The first category includes commands which pertain to the setting up and maintaining of a session between the host server and the requester. Once the host server is set up, commands in this category are typically executed by the host server. The second category of commands includes commands which request interaction with a data base. Host server typically calls data base intrinsics to execute these commands. The third category of commands includes commands which are calls to the operating system. Host server typically calls operating system intrinsics to execute these commands. The fourth category of commands includes commands which are calls to remote procedures. These remote procedures are procedures written for a specific application, but which reside on the host computer rather than the personal computer. The host server typically call remote procedure intrinsics to execute these commands. The fifth category of commands includes commands which are used for housekeeping. For example, the requester may request host server for certain status information. Commands in this category are typically executed by the host server.

When the host server is started in response to a requests originated by an application, host server allocates a certain amount of memory on the host computer for use by the application as a scratch pad. Through the use of remote procedures the application may store information to the scratch pad, modify data in the scratch pad and retrieve data from the scratch pad.

DESCRIPTION OF THE PREFERRED EMBODIMENT

Figure 1:
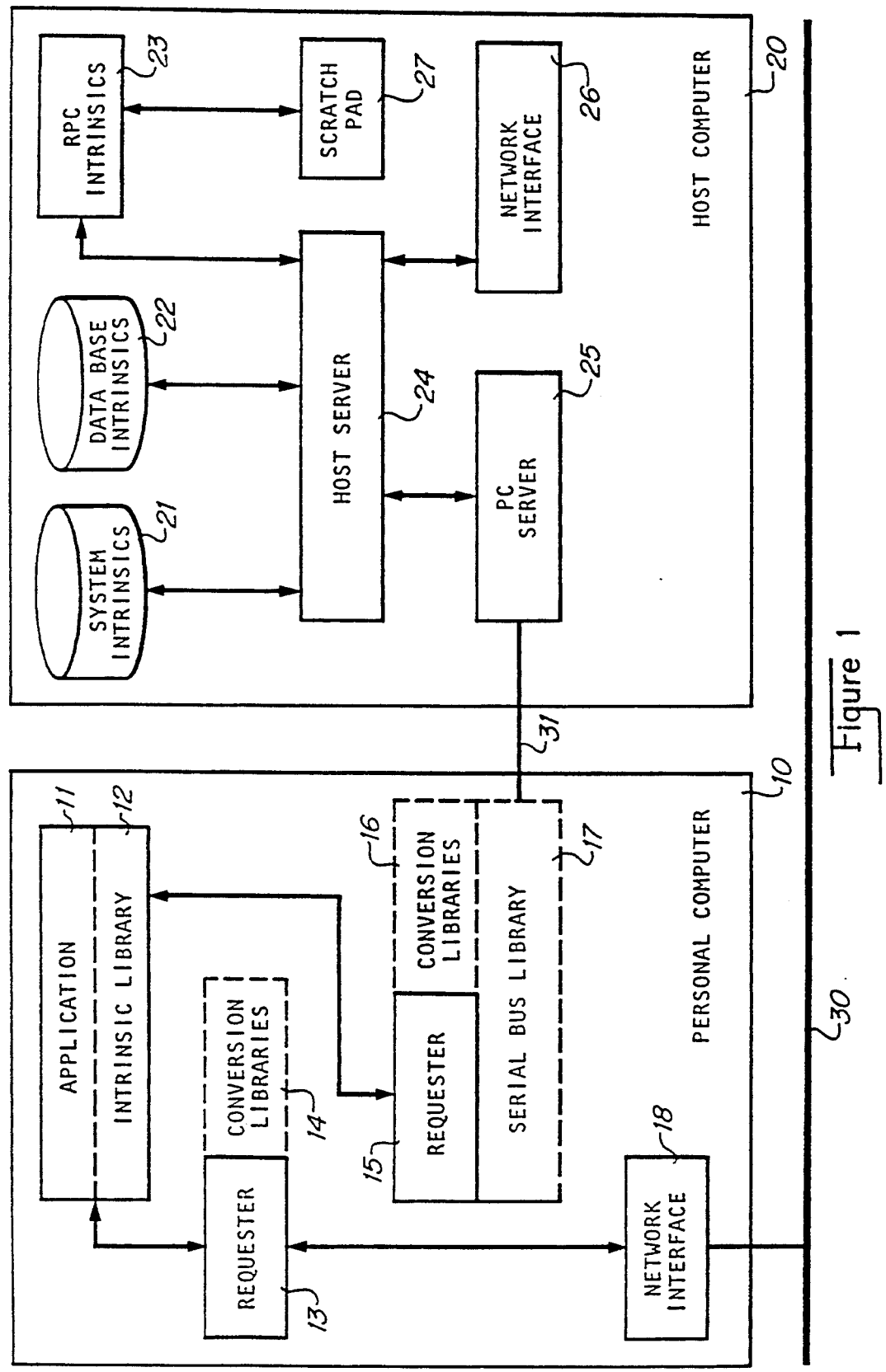
FIG. 1 shows program modules within a personal computer and within a host computer which allow for cooperative processing between the host computer and personal computer in accordance with a preferred embodiment of the present invention.

FIG. 1 shows program modules within a personal computer 10 and a host computer 20. These program modules allow for cooperative processing between host computer 20 and personal computer 10. An application 11 calls an intrinsic library 12 in the same way application 11 makes other procedure or function calls. For example, this means that a return address, parameter values and/or addresses are placed on a program stack segment 70 (shown in FIG. 3), and that control is transferred to intrinsic library 12. In the preferred embodiment host computer 20 is an HP 3000 computer available from Hewlett Packard Company, a California Corporation having a place of business at 3000 Hanover Street, Palo Alto, Calif. 94304. In the preferred embodiment personal computer 10 may be, for example a VECTRA personal computer, a Touchscreen personal computer, or a Portable Plus personal computer all available from Hewlett Packard Company.

Figure 3:
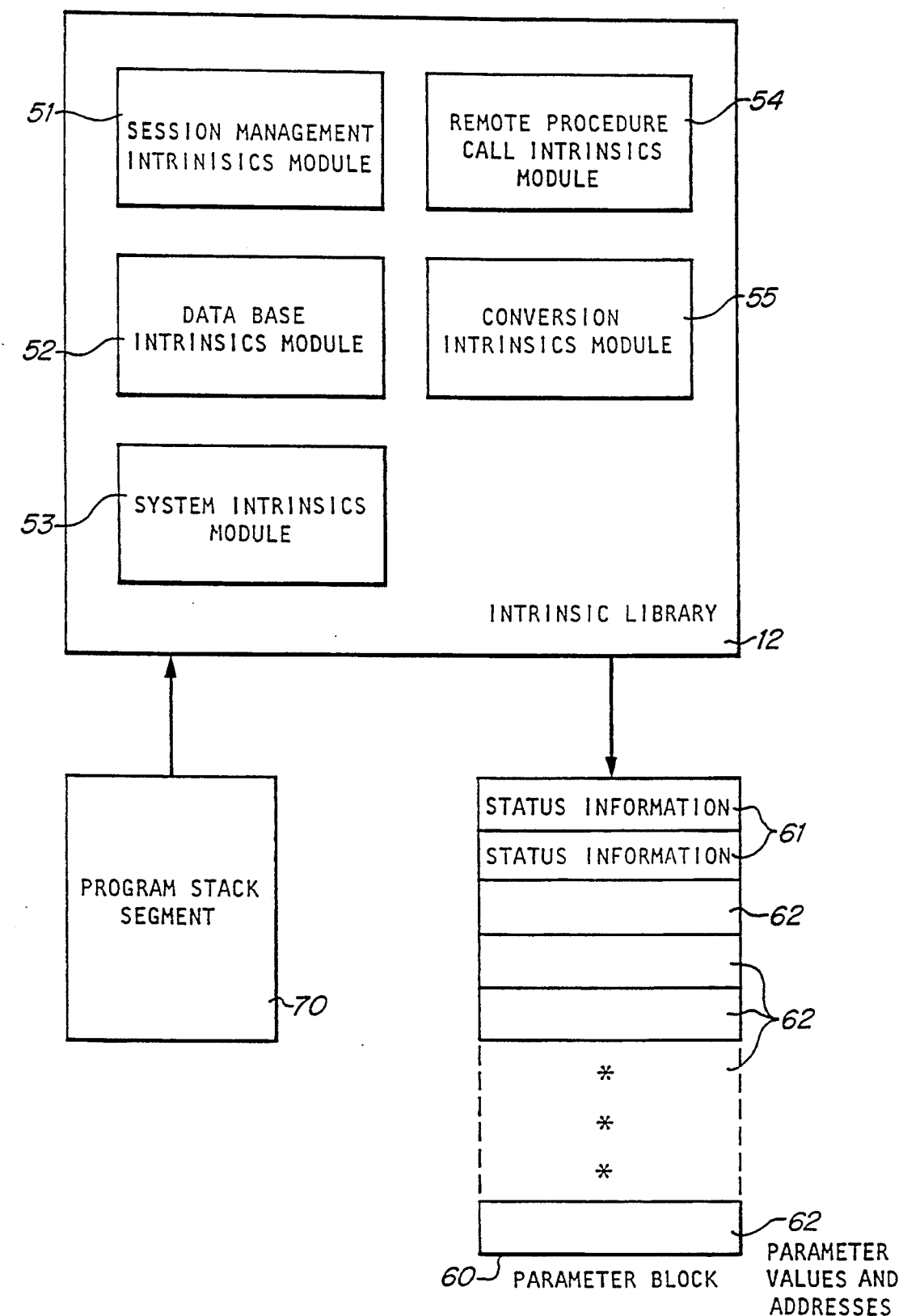
FIG. 3 shows a parameter block and details of an intrinsic library shown in FIG. 1.

As shown in FIG. 3, intrinsic library 12 is composed of 5 modules. Each module contains intrinsics which are responsible for processing a particular class of intrinsic calls. Each module places output into parameter block 60. Parameter block 60 receives from each module two words 61 of status information, and a number of words 62 of parameter values and addresses. For each module the number and arrangement of words 62 varies.

The first module within intrinsic library 12 is session management intrinsics module 51. Session management intrinsics module 51 handles commands from application 11 which are directed to control the link between personal computer 10 and host computer 20 and which perform other tasks which manage the session between personal computer 10 and host computer 20. Session management intrinsics module 51 extracts information from program stack segment 70 and after changing the format, places the information in parameter block 60.

Data base intrinsics module 52 handles commands from application 11 which are to be executed by data base intrinsics 22. Data base intrinsics 22 resides on host computer 20 as shown in FIG. 1. With the use of a table, data base intrinsics module 52 generates output which is placed in parameter block 60. Using the table, data base intrinsics module takes parameters and other information from program stack 70, translates the parameters and other information, and places them in parameter block 60.

Translation of the parameters may include, for example, placing the parameters in parameter block 60 without modifying the parameters, modifying the parameters before placing them in parameter block 60, or placing substitute parameters or other information into parameter block 60.

Data base intrinsics module 52 also uses the table to determine how parameters are to be passed to host computer 20. For example, the implemented data base may be TruboIMAGE, available from Hewlett Packard Company. System intrinsics module 53 handles commands from application 11 which are to be executed by system intrinsics 21. System intrinsics 21 reside on host computer 20. With the use of a table, system intrinsics module 53 generates output for placement in parameter block 60. Using the table, system intrinsics module 53 takes parameters and other information from program stack 70, reformats the parameters and other information, and places them in parameter block 60. System intrinsics module also uses the table to determine how a parameters are to be passed to host computer 20. In the preferred embodiment of the present invention MPE is used as the system program for host computer 20. MPE system program for HP 3000 computer is available from Hewlett Packard Company.

Remote procedure call (RPC) intrinsics module 54 handles commands from application 11 which are to be executed by RPC intrinsics 23. RPC intrinsics 23 reside on host 20. With the use of a table, RPC intrinsics module 54 generates output for placement in parameter block 60. Using the table, RPC intrinsics module 54 takes parameters and other information from program stack 70, reformats the parameters and other information, and places them in parameter block 60.

Conversion intrinsics module 55 handles commands from application 11 which are to be executed by conversion modules 14 or conversion modules 16. Conversion intrinsics module 55 extracts information from program stack 70, reformats the information and places the information in parameter block 60.

As shown in FIG. 1, requester 15 receives intrinsic calls from intrinsic library 12 when data is to be transferred to host 20 through a point to point data communication link 31. Requester 13 receives intrinsic calls from intrinsic library 12 when data is to be transferred to host 20 through a local area network (LAN) 30. When requester 13 or requester 15 receives a software interrupt from intrinsic library 12, requester 13 or requester 15 accesses a predetermined address to discover the location within parameter block 60 which contains addresses and parameters related to the particular procedure call.

Figure 4:
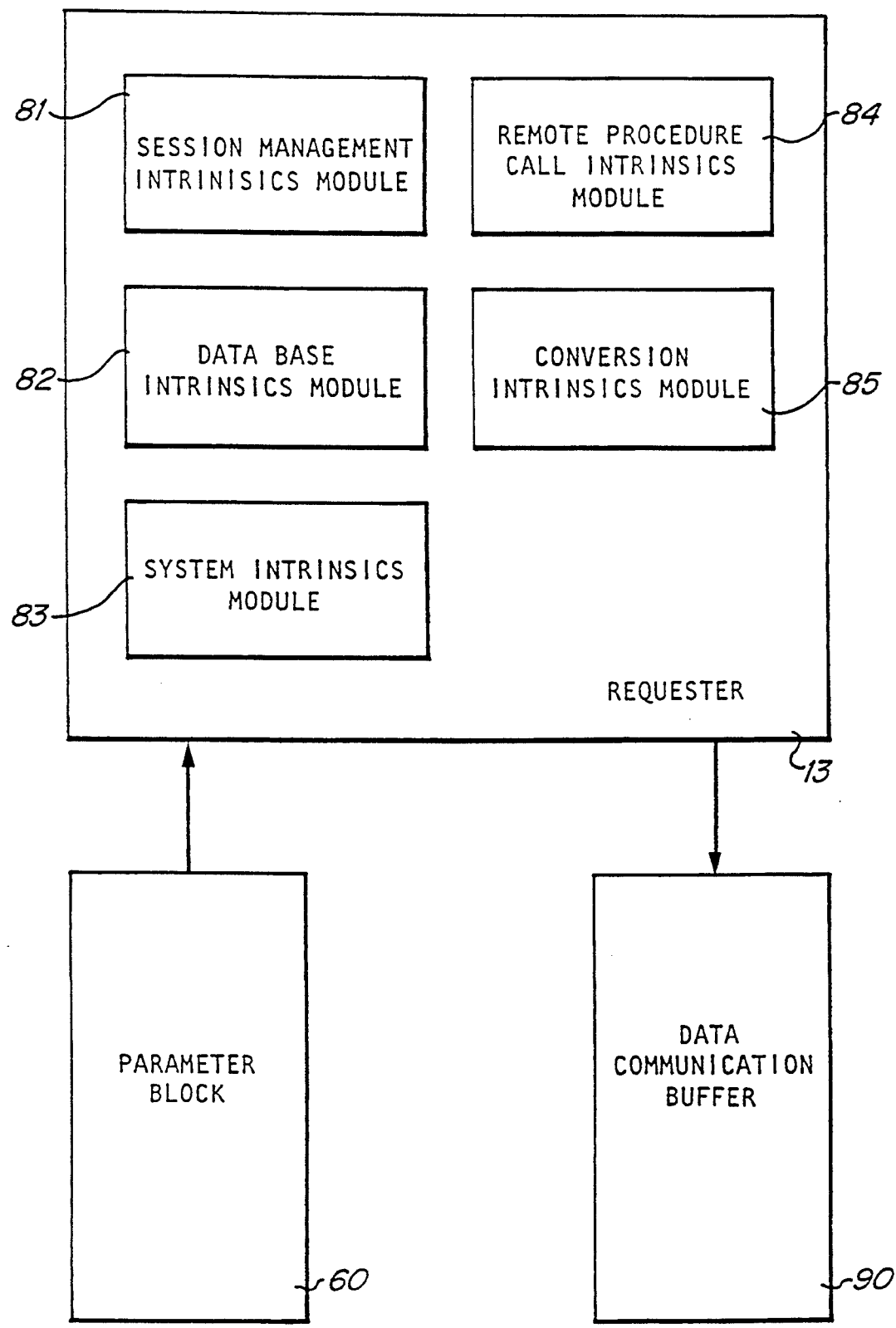
FIG. 4 shows additional detail of the program modules shown in FIG. 1.

Requester 13 and Requester 15 have the same structure. In FIG. 4, requester 13 is shown to be composed of five modules: a session management intrinsics module 81 which processes session management intrinsics, a data base intrinsics module 82 which processes data base intrinsics, a system intrinsics module 83 which processes system intrinsics, a remote procedure call intrinsics module 84 which processes remote procedure call intrinsics and a conversion intrinsics module 85 which processes remote procedure call intrinsics. Each logic module extracts information from parameter block 60.

Session management intrinsics module 81, data base intrinsics module 82, system intrinsics module 83 and remote procedure call intrinsics module 84 utilize a "skeleton' processor'. The skeleton processor is essentially code which uses a table that defines the steps which must be taken to process a given intrinsic. Based on information in the table, the identity of the intrinsic and the parameters of the intrinsic the skeleton processor processes the intrinsic. Each intrinsic is processed using all or a subset of process steps. The process steps are common across all intrinsics, although a particular intrinsic may not use all of the steps.

Output from session management intrinsics module 81, data base intrinsics module 82, system intrinsics module 83 and remote procedure call intrinsics module 84 are placed in data communication buffer 90. Data placed in data communication buffer 90 is in the form of messages. The form of these messages is that of a message 100, shown in FIG. 5. Parameter block 60 is used to generate the messages, however the data within the messages may differ significantly from the data within parameter block 60. For example, pointers to values in parameter block 60 are replaced by the values themselves in the generated messages. Conversion intrinsics module 85 passes conversion intrinsics to a appropriate conversion library within conversion libraries 14. A table determines which conversion library will be used and how the information will be reformatted.

In FIG. 1, conversion libraries 14 and conversion libraries 16 consist of routines which convert specific data formats which are available on host computer 20 into an equivalent format for personal computer 10. These routines also convert specific data formats which are available on personal computer 10 into an equivalent format for host computer 20. This is necessary because different programming languages used may use different formatting for stored data. Also, the same programming languages may use different formatting for storing data when the programming language is run on a different type of computer.

If data communication link 31 is used for transmission of data between personal computer 10 and host computer 20, requester 15 calls serial bus library 17 to transfer information over data communication link 31 to a PC server 25 within host computer 20. Standard point to point data communication technology may be used. For example, serial bus library 17 may be implemented using Extended Data Communication Library (EDCL) available as a product from Hewlett Packard Company with a product name of Basic Serial. Also, PC server 25 may be implemented using PCSERVER, which is part of the fundamental Operating System distributed for use on Hewlett Packard Company Model 3000 computers.

If LAN 30 is used for transmission of data between personal computer 10 and host computer 20, requester 13 calls network interface 18 for the transfer of information over LAN 30 to a network interface 26 within host computer 20. Standard LAN technology may be used to implement Network interface 18 and network interface 26. For instance, network interface 18 may be implemented using OfficeShare available from Hewlett Packard Company. Similarly, network interface 26 may be implemented using AdvanceNet, also available from Hewlett Packard Company. A host server 24 receives messages from PC server 25 and network interface 26 processes the messages, and returns messages to requester 13 and requester 15. Host server 24 may consist of two separate programs: one program which handles messages which come over serial data communication link 31 and a separate program which handles messages which come over LAN 30.

In order to execute the messages, host server 24 calls system intrinsics 21, data base intrinsics 22 and RPC intrinsics 23. Depending upon the type of software such as system software and data base software used, different intrinsics may be implemented. For instance, in the preferred embodiment, data base intrinsics 22 include intrinsics for the IMAGE data base which execute the following commands: DBOPEN, DBINFO, DBCLOSE, DBFIND, DBGET, DBUPDATE, DBPUT, DBDELETE, DBLOCK, DBUNLOCK, DBCONTROL, DBBEGIN, DBEND, DBMEMO, DBERROR and DBEXPLAIN. Similarly, system intrinsics 21 execute the following MPE FILE commands: FCHECK, FCLOSE, FCONTROL, FFILEINFO, FOPEN, FREAD, FWRITE, FERRMSG and COMMAND.

RPC intrinsics 21 are host routines written, compiled, and placed in host libraries which can be called by host server 24 upon request sent from personal computer 10. A host routine, once called, uses data provided in a request message originated from personal computer 10. The host routine in a return message returns data and completion status to a personal computer 10.

Upon being started, host server 24 allocates a portion of memory as a scratch pad 27. Scratch pad 27 may be used by routines on personal computer 10 as temporary local storage on host 20. For example, application 11 through RPC intrinsics 23 may store, modify and retrieve data placed in scratch pad 27. Upon termination of host server 24, the memory allocated to scratch pad 27 is freed by host 20 for reallocation.

Additional commands are executed by intrinsics implemented in the preferred embodiment of the present invention. For example, a "trace on" and a "trace off" command are implemented. The "trace on" command directs host server 24 to log data communication and/or intrinsic tracing data to a file. Also, a "start session" and a "stop session" are implemented. These commands direct host server 24 to start or stop a server session on host 20. Further, a "status checking" command are implemented. A "status checking" command, generated by requester 13 or by requester 15, causes host server 24 to verify compatible interface versions are being used. Finally, a READ STDLIST command directs host server 24 to read a standard list device output generated by DBEXPLAIN (see above) for transmission back to personal computer 10.

Figure 5:
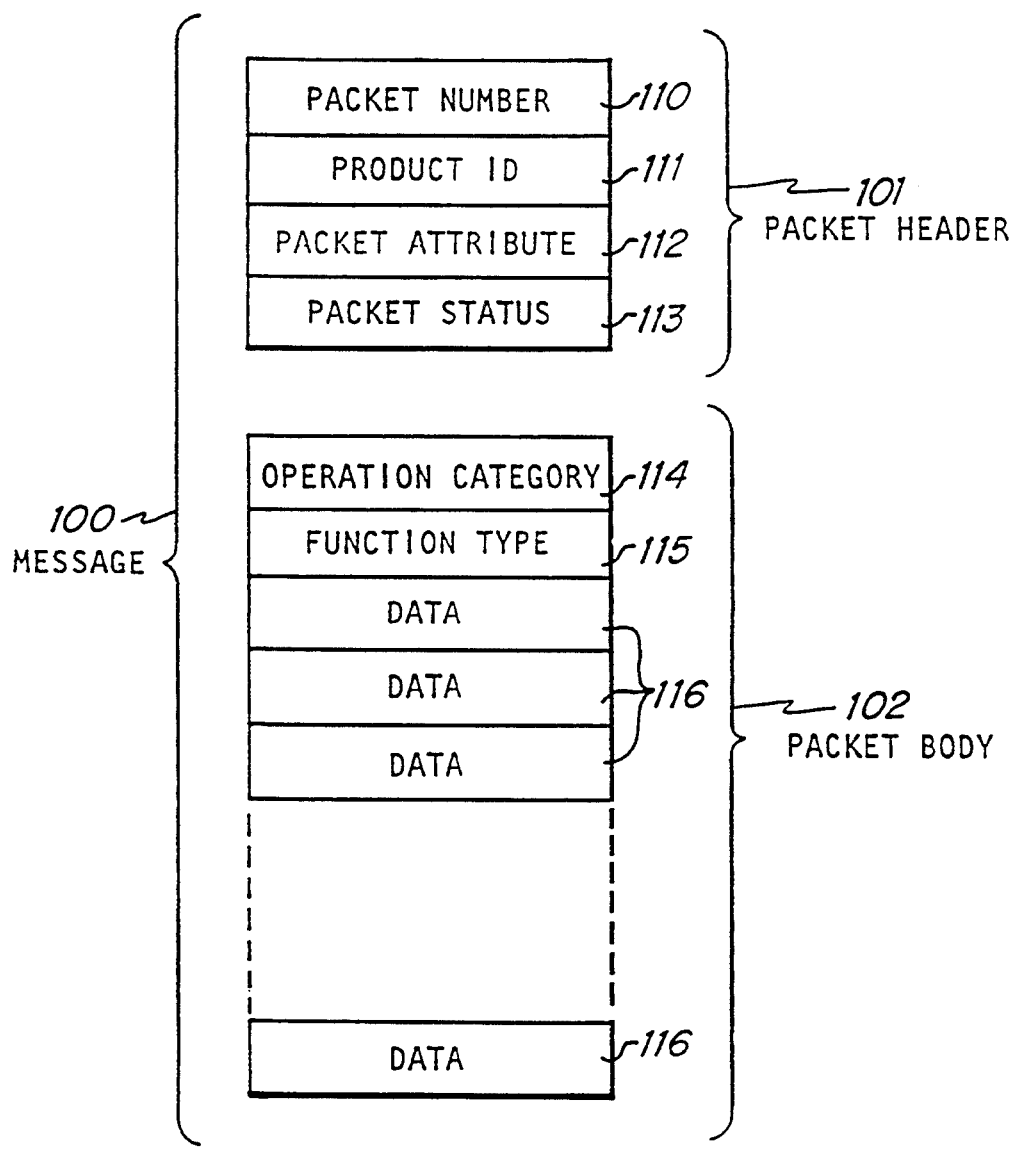
FIG. 5 shows a block diagram of messages sent between the host computer and the personal computer shown in FIG. 1 in accordance with the preferred embodiment of the present invention.

FIG. 5 shows the format of messages sent between personal computer 10 to host computer 20. On personal computer 10, requester 13 and requester 15 create and interpret the messages. On host computer 20, host server 24 creates and interprets the messages.

As shown in FIG. 5, a message 100 includes a packet header 101 and a packet body 102. Packet header 101 includes a packet number 110, a product ID 111, packet attribute byte 112 and a packet status byte 113. Packet attribute byte indicates the origin of the message, e.g. whether it is from host 20 or personal computer 10.

Packet body 102 includes an operation category byte 114 and a function type 115. For example, operation category byte 114 may indicate in the category of an intrinsic included in the message. For instance, the intrinsic may be categories as (1) system control intrinsic, (2) a data base intrinsic, (3) an operating system intrinsic, (4) a remote procedure call intrinsic, or (5) a special intrinsic used for housekeeping, status, etc. Function type 115 may contain or identify a command which invokes a particular intrinsic.

When application 11 desires to start a session on host computer 11, application makes two function calls: a function call requesting a connection to host computer 20, and a function requesting the start of a session. Requester 13 and requester 15 respond differently to these two commands.

Upon receiving a connect function call, requester 15 sends out a message containing a "log on" string to PC server 25. PC server 25 passes the "log on" string to the operating system of host computer 20. Upon receiving from application 11 a request for a start session, requester 15 directs PC server 25 to start host server 24.

PC server 25 starts host server 24 by issuing a create process intrinsic. Upon starting, host server 24 determines how it was initiated. Upon determination that PC server 25 initiated host server 24, host server 24 opens two circular message files. These are used for communication between PC server 25 and host server 24. Host server 24 then waits for a check status message from requester 15. The check status message allows host server 24 to determine whether host server 24 and requester 15 are compatible. Once it has been determined that compatible interface versions are being used, host server 24 proceeds to process messages from personal computer 10 until host server 24 receives a session stop message. At that point the two circular message files are closed and host server 24 terminates.

Upon receiving a connect function call, requester 13 sends out a message requesting network interface 26 to start a host server session. Network interface 26 starts host server 24 by use of a system process. For example, in the preferred embodiment, when AdvanceNet is used, system process DSDAD through a network monitor process monitors LAN 30. Upon receiving the request to start a server session, DSDAD starts host server 24.

Upon starting, host server 24 determines how it was initiated. Upon determination that a system process initiated host server 24, host server 24 creates a port and add it to a list of open ports within host 20. Host server 24 then waits for a check status message and a start session message. When a start session message is received, host server 24 gets a virtual terminal connection, starts a session using a "log on" string from requester 13. Host server 24 then adopts itself to the started session, that is, host server 24 causes its farther process to be changed from DSDAD to the started session. Host server 24 then processes messages received from personal computer 10 until a stop session message is received. Then host server 24 terminates the sessions and closes the virtual terminal connection.

Messages from personal computer 10 to host computer 20 carry commands which are executed by system intrinsics 21, data base intrinsics 22 and RPC intrinsics 23. Generally, after execution, host computer 20 returns to personal computer 10 a return message which includes, for example, data and/or status.

For messages carrying commands for IMAGE data base to be executed by data base intrinsics 22, data 116 contains parameters to the file and command intrinsics, and where a parameter is variable in length, a size parameter. Messages returned to personal computer 10 consists of a condition code, status and data appropriate for the intrinsic. However, return messages for IMAGE commands DBERROR and DBEXPLAIN do not include status. Further DBEXPLAIN does not return a message but writes information into a storage location IMAGE called a stdlist file. In order to retrieve this information personal computer 10 issues a READ STDLIST command to get a message.

For messages carrying commands for an MPE system program to be executed by system intrinsics 21, data 16 contains parameters to the file intrinsics—which are the intrinsics which execute FREAD and FOPEN commands—and to the COMMAND intrinsic and, where a parameter is variable length, a size parameter. Messages returned to personal computer 10 include a condition code and the data normally returned to a process which executes the particular MPE system command.

The FREAD and FOPEN intrinsics return messages which have an extra parameter. The parameter returns function values from the intrinsic.

For messages which carry remote procedure calls to be executed by RPC intrinsics 23, data 116 contains RPC data, a field designating the number of bytes of RPC data being sent and a field designating the number of bytes of return data personal computer 10 expects to receive from host computer 20 as a result of the message. Messages returned to personal computer 10 include a condition code, status, return data and a field designating the number of bytes of return data. The RPC data includes the name of the procedure to be called and the data to be passed to the procedure. Upon receiving a message for a remote procedure call, host server 24 retrieves the procedure from RPC intrinsics 23, executes the intrinsic and loads the return data into the return message.

Host server 24 recognizes a "trace on" message and a "trace off" message. The request message for a "trace on" contains fields which indicate the type of tracing to be done. This field indicates whether intrinsic tracing, data communication tracing, or both is to occur.

When host server 24 receives a message indicating intrinsic tracing is to be done, host server 24 opens an output file. Into this output file is logged the data from request message. Also placed in this file is return data from return messages sent in response to messages which carry remote procedure calls.

When host server 24 receives a message indicating data communication tracing is to be done, host server 24 also opens an output file. Into this file is logged data communications packets which pass between PC server 25 and host server 24, and/or data communication packets which pass between network interface 26 and host server 24.

When host server 24 receives a "trace off" message no further logging is done and any open output files are closed.

Host server 24 also recognizes a "start session" message and a "stop session" message which are sent over LAN 30. For a "start session" message, data 116 contains a character string used for "log on" to host computer 24. A return message for the "start session" message includes information pertaining to any detected error. For a "stop session" message no data is sent. A return message for the "stop session" message includes information pertaining to any detected error.

For a "start session" message sent over LAN 30, host server 24 gets a virtual (pseudo) terminal connection, starts a session using the included character string and adopts itself to that session. For a "stop session" message sent over LAN 30, host server 24 terminates the session and closes the virtual terminal connection.

Requester 13 or requester 15 to host server 24 can send a request message which includes a "status checking" command. Such a request message includes within data 116 the packet buffer size, version number of requester 13 or 15, and a transport flag, which gives further information on capabilities supported by the requester initiating the message. A return message sent from host server 24, includes the error information and the version number of host server 24.

Upon receiving a request message which includes a "status checking" command host server 24 checks the enclosed version number to determine whether the version number sent in the message describes a version host server 24 is able to interact with. If so host server 24 returns its own version number to personal computer 10. Otherwise, the return message includes error information.

A request message for a READ STDLIST command does not contain data field 16. A return message sent from host 24 includes error information, data, and a field which indicates the amount of data within the return message.

Upon receipt of a request message for a READ STDLIST command, host server 24 closes the stdlist file, and loads the contents into the return message.

Figure 2:
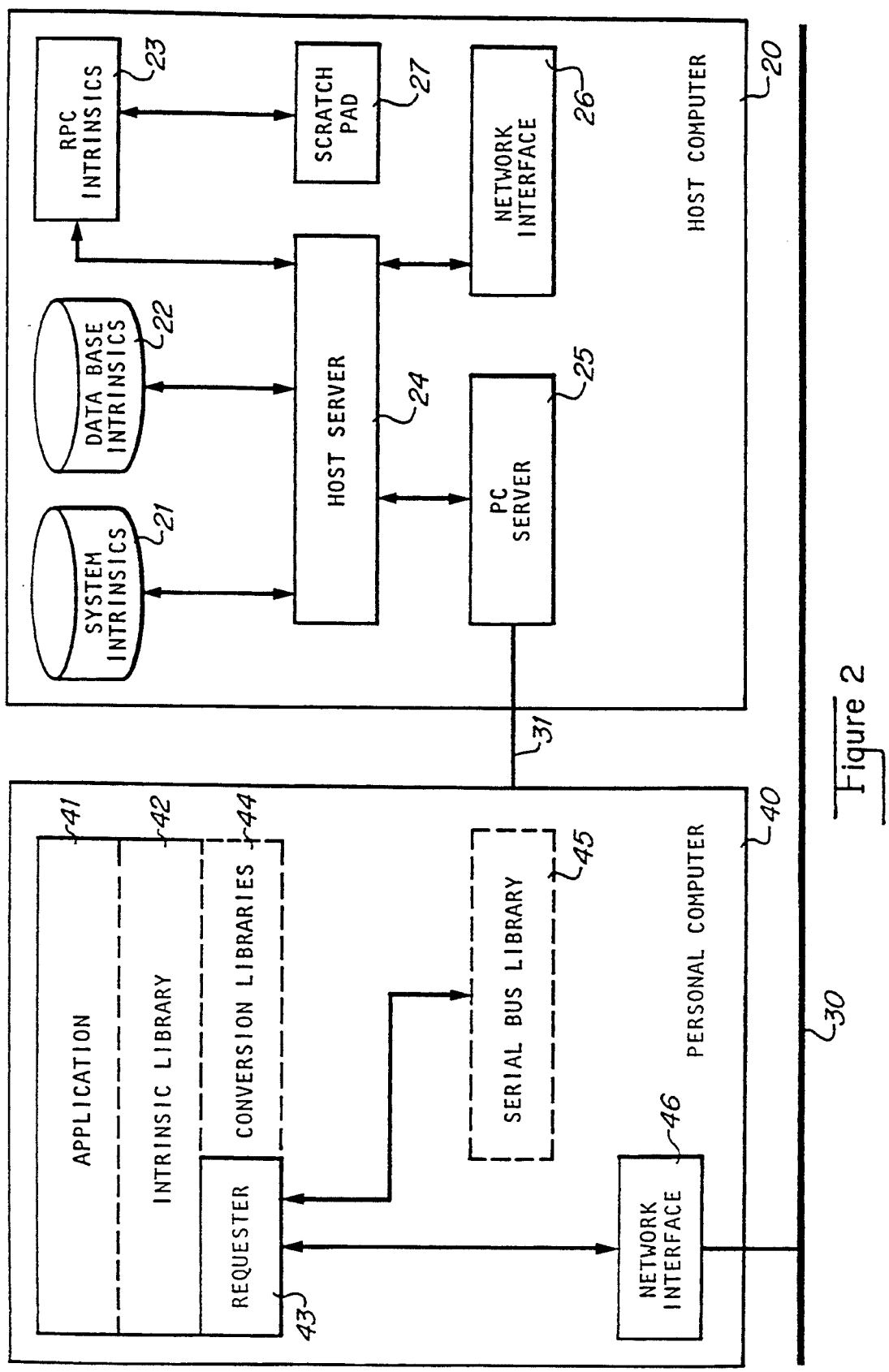
FIG. 2 shows an alternate embodiment of some of the program modules shown in FIG. 1.

In FIG. 2, a personal computer 40 is shown to have an alternate configuration to personal computer 10. An application 41 calls an intrinsic library 42 in the same way application 41 makes other procedure or function calls. A single requester 43 receives intrinsic calls from intrinsic library 42 when data is to be transferred to host 20 through data communication link 31 or LAN 30. Requester 43 calls serial bus library 45 to transfer information over data communication link 31 to PC server 25 within host computer 20. Requester 43 calls network interface 45 for the transfer of information over LAN 30 to network interface 26 within host computer 20. Conversion intrinsics from intrinsic library 42 are passed to conversion libraries 44.

I claim:

1. In a computer system having a first computer, a host computer and a data transport system, the data transport system coupled to the first computer and the host computer, a method for facilitating execution of a plurality of commands by the host computer, the plurality of commands being originated by an application process which resides on the first computer, the method comprising the steps of:

(a) sending a function call from the application process to the host computer establishing a session which is dedicated specifically to execution of the plurality of commands being originated by the application process, step (a) being initiated by the application process upon the application process determining at least one of the plurality of commands is to be executed by the host computer;

(b) transferring, by the application process, the plurality of commands from the application process to a requester program segment, the requester program segment being dedicated to preparing information to be transported to the host computer;

(c) preparing the plurality of commands, by the requester program segment, to be transported to the host computer by translating the plurality of commands to produce translated commands the requester program segment running on the first computer;

(d) transporting the translated commands during the session from the first computer to the host computer over the data transport system;

(e) receiving of the translated commands by a host server program residing on the host computer; and (f) calling of intrinsic program segments by the host server program to execute the translated commands, the intrinsic program segments running on the host computer wherein step (f) comprises the substeps of (f1) calling data base intrinsic program segments to execute commands which operate on a data base, (f2) calling system intrinsic program segment to execute commands which are commands normally executed by an operating system of the host computer, and (f3) calling remote procedure intrinsic program segments for the execution of commands specific to the application process.

2. A computer system with a host computer connected to one or more smaller computer through a data transport system, the data transport system for transferring data between the host computer and the one or more smaller computers, the computer system comprising:

at least one smaller computer for running PC-based applications;

a PC-based application which includes a first group of calls and procedures which are intended to be executed by the at least one smaller computer, and a second group of calls and procedures which the PC-based application intends to be executed by the host computer during a session initiated by said PC-based application, the session being dedicated specifically to the second group of calls and procedures originated by the PC-based application and the session being originated by the PC-based application upon the PC-based application determining at least one call or procedure of the second group of calls and procedures is to be executed by the host computer; and, a requester process running on the at least one smaller computer, the requester process being dedicated to preparing information to be transported to the host computer, the requester process including means for starting the session on the host computer in response to a request from the PC-based application, and means, in response to the PC-based application, for forwarding the second group of calls and procedures to the data transport system for transfer to the host computer for immediate execution by the host computer during the session;

wherein the second group of calls and procedures are executed by the host computer using intrinsic program segments residing in the host computer and wherein said intrinsic program segments are taken from a group composed of system intrinsics, database intrinsics, and remote procedure call intrinsics.

* * * * *